United States Patent [19]

Bigo et al.

[11] Patent Number: 4,823,339
[45] Date of Patent: Apr. 18, 1989

[54] METHOD AND DEVICE FOR PROTECTING MODEMS AGAINST ECHOES

[75] Inventors: Firmin Bigo, Cagnes Mer; François LeMaut, Nice, both of France

[73] Assignee: International Business Machines Corporation, Armonk, N.Y.

[21] Appl. No.: 55,223

[22] Filed: May 29, 1987

[30] Foreign Application Priority Data

Jul. 15, 1986 [EP] European Pat. Off. ........ 86430027.2

[51] Int. Cl.$^4$ ............................................. H04B 3/20
[52] U.S. Cl. .................................. 370/32.1; 375/104; 379/406
[58] Field of Search ................. 370/32, 32.1; 375/8, 375/58, 75, 99, 103, 104; 379/3, 407, 410, 411, 406

[56] References Cited

U.S. PATENT DOCUMENTS

| 4,009,356 | 2/1977 | Borysiewicz et al. | 375/8 |
| 4,044,307 | 8/1977 | Borysiewicz et al. | 375/8 |
| 4,593,399 | 6/1986 | Baugh et al. | 370/32.1 |
| 4,694,450 | 9/1987 | Staab | 370/32.1 |

FOREIGN PATENT DOCUMENTS 0225652 6/1987 European Pat. Off. ........... 370/32.1

OTHER PUBLICATIONS

G. Larsen & P. Besslich; An Improved Receiver for Baseband Data Communication Using A Digitally Controlled AGC; Int. Journal Electronics; 1977; vol. 43, No. 6; pp. 593–598.

Primary Examiner—Jin F. Ng
Assistant Examiner—Randall P. Myers
Attorney, Agent, or Firm—John B. Frisone

[57] ABSTRACT

The device for providing protection against echoes includes a level memory (33) for storing a value Gs and a comparator (34) for comparing the level Gx provided by an AGC device (31) upon receipt of a message with a value Gs stored in the level memory (33) and for supplying a resetting signal to the equalizer (35) for resetting the coefficients thereof to zero together with a signal for storing the level Gx as a new value Gs in the level memory (33) where Gx exceeds Gs by a predetermined value, or for supplying a signal for inhibiting the decoding of the data signals where Gx falls short of Gs by a predetermined value, thereby indicating that the received message is an echo.

3 Claims, 2 Drawing Sheets

METHOD AND DEVICE FOR PROTECTING MODEMS AGAINST ECHOES

This invention relates to the transmission of data by means of analog signals, and more particularly to a method that provides protection against echoes received by a modem when transmitting data messages over a satellite link.

In data transmission systems wherein data are transmitted as analog signals over telephone lines, the intelligence to be conveyed takes the form of modulations of a carrier signal. Generally, the carrier signal is modulated by a modulator at the sending end and demodulated by a demodulator at the receiving end, the modulator/demodulator combination being called a modem.

Where data are transmitted over a telephone line between a couple of remote data terminal equipments (DTEs), it is as if the data were sent by a transmitting modem to a receiving modem.

A well-known disadvantage of this type of transmission is that a message just transmitted by a modem may be reflected back, or echoed, thereto. This condition is undesirable in that it may perturb the data and in that the echo may be erroneously identified as a data message from the remote modem. For this reason, modems usually incorporate an anti-echo device of the type prescribed by CCITT Recommendation 27 ter. This device eliminates all echoes for 100 ms after the end of the message from the sending modem.

Digital data usually are transmitted over leased lines. Whenever a leased line becomes unavailable or unusable for any reason, the data must be sent over the public switched network (PSN). Some modems are, therefore, equipped with a so-called switched network backup (SNBU) device.

As a result of the development of telecommunication facilities, long-distance telephone links are increasingly using geostationary satellites located 36,000 km (20,000 miles) from Earth. If two SNBU-equipped modems are connected to the PSN network because of some failure of the leased line that interconnects them, they can exchange data messages through a geostationary satellite. As will be appreciated, the echo of a message would be received by the transmitting modem 500 m after the end of the message, and the anti-echo device of CCITT Recommendation 27 ter would be useless. Anti-echo devices designed for public network telephone lines are available, but these are not considered effective enough, particularly where data transmission is involved.

It is, therefore, the object of the present invention to provide a method for protecting a modem against the effects of echoes of data messages that modem is transmitting to a remote modem via a satellite.

The method of the invention comprises the steps of: comparing the energy level provided, upon receipt of a message, by an automatic gain control (AGC) device with a previously saved value; supplying a signal to reset and adjust the coefficients of the equalizer within the modem when the level provided by the AGC device exceeds the previously saved value by a predetermined amount and, in that case, replacing the previous saved value by the value provided by said AGC device; and decoding the received message as well as all subsequent messages whose the energy level is higher than or equal, to the saved value minus said predetermined amount, so that all received messages whose the energy level is less than said saved value, minus said predetermined amount, will be assumed to be echoes and, consequently, will be ignored.

The invention will now be described with reference to the accompanying drawings, of which:

Figure 1:
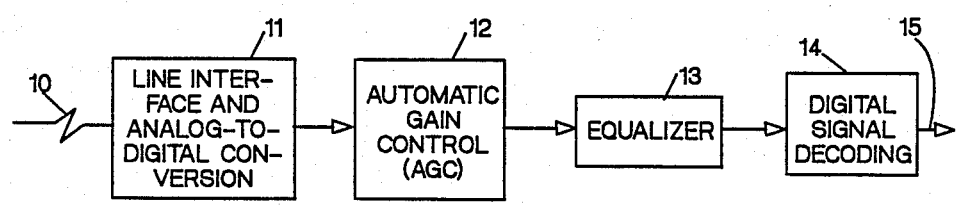
FIG. 1 is a functional diagram of the receiving portion of a modem.

Referring now to FIG. 1, there is shown a functional diagram of the receiving portion of a modem which is useful in explaining the invention. The analog signals from telephone line 10 are first processed by a line interface and analog-to-digital conversion device 11 where, after filtering, they are converted to digital signals.

The first data message from the sending modem to the receiving modem is preceded by a training sequence usually comprised of constant-amplitude signals representative of the frequency spectrum of the line. Upon receiving this sequence, an AGC device 12 computes a gain that is dependent on the energy of the received signals and will then be used as a factor by which to multiply the data signals. Next, the training sequence is applied to an equalizer 13, the coefficients of which are computed so as to compensate for the distortion effects that are caused by the telephone line and vary as a function of frequency. The distortion-free digital signals the level of which has thus been adjusted are then applied to a decoder 14 that decodes them and provides on output line 15 digital data intended for a data terminal equipment (DTE).

When a modem not equipped with the device of the present invention receives a message sent thereto via a satellite, that message may be an actual data message from the remote modem, but may also be the echo of a data message it has just sent to the remote modem if, as has been seen, the public network anti-echo device is not effective enough. In the latter case, the coefficients of the equalizer are computed from the training sequence that precedes the message, taking into account echo distortions caused by the transmission line. Now, the echo undergoes distortions during transmission from the sending modem to the receiving modem, and again during transmission from the receiving modem to the sending modem, contrary to a true message which is only distorted during transmission from the receiving modem to the sending modem. Accordingly, when the true message is received from the remote modem, it is equalized by equalizer 13 the coefficients of which were computed by taking the echo into account, thereby completely perturbing the data being received.

Figure 2:
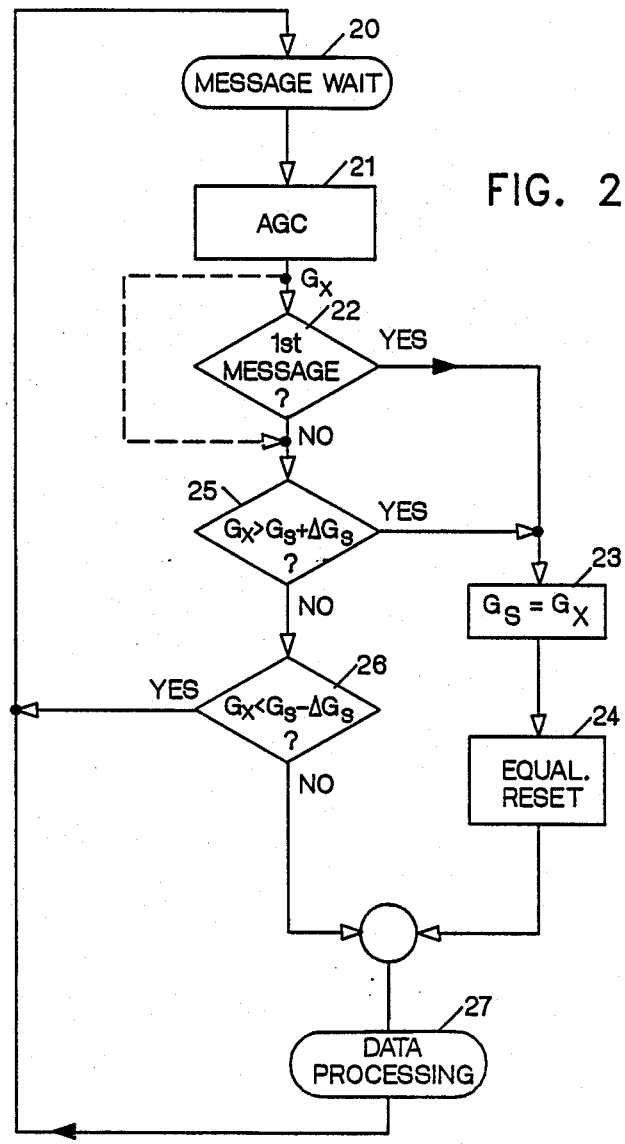
FIG. 2 is a flow chart of the method of the invention.

The present invention makes it possible to eliminate this undesirable effect of the echo, as explained below with reference to FIG. 2.

Let us now assume that the modem is waiting for a message (block 20). It should be clarified at this point that the method to be described is equally applicable where a sending modem is waiting for a remote modem's response to a message it has just sent thereto, and where a receiving modem is waiting for a message from the sending modem.

When a message is received by the modem, it is applied to the AGC device (block 21), which computes the energy level $G_x$ required for the incoming signals. At this stage, a block 22 may be included to determine whether or not the message is a first message. If it is, $G_x$ is saved as a threshold value Gs (block 23), and the coefficients of the equalizer are reset to zero and will then be adjusted according to the signals in the training sequence.

If the received message is not a first message, one determines (block 25) whether the level Gx exceeds the threshold value Gs to which a predetermined amount ΔGs has been added. The values of Gx for a number of true messages received from the remote modem can vary within a specific range, but the level for an echo is substantially less than that for a true message, with the difference being at least equal to a predetermined value ΔGs (of about 7 db).

If Gx exceeds Gs+ΔGs, this means that the received message is a true message and that the previous message was an echo, since the saved value Gs falls short of Gx by more than ΔGs. In this case, Gx becomes the new saved value Gs, and the coefficients of the equalizer are reset to zero and adjusted, taking into account the training sequence that precedes the message.

Note that block 22 mentioned earlier merely provides a convenient means of saving a first value of Gs and is not essential. This block can be dispensed with, as indicated by the dotted lines, in which case the initial value of Gs will be zero.

It is next determined, at block 26, whether the value of Gx is less than Gs, to within ΔGs. If the received message is an echo, this condition is satisfied and the message is ignored. A loop is then entered to return to block 20, pending receipt of another message. On the other hand, if the message is a true message, then Gx is equal to the stored value of Gs, to within ΔGs, and the condition specified in block 26 is not satisfied. The message involved is then processed (block 27) and the flow returns to block 20.

If the modem under consideration here is the receiving modem, the first message that is received is the true message from the sending modem. Consequently, as soon as this message is received, the coefficients of the equalizer are properly adjusted and the stored value of Gs will not be modified since the only different values of Gx (to within ΔGs) that the AGC device will thereafter determine will denote echoes.

The method of the invention, as described with reference to FIG. 2, can readily be implemented by a program executed by the processor that manages most of the processing carried out in today's modems.

Figure 3:
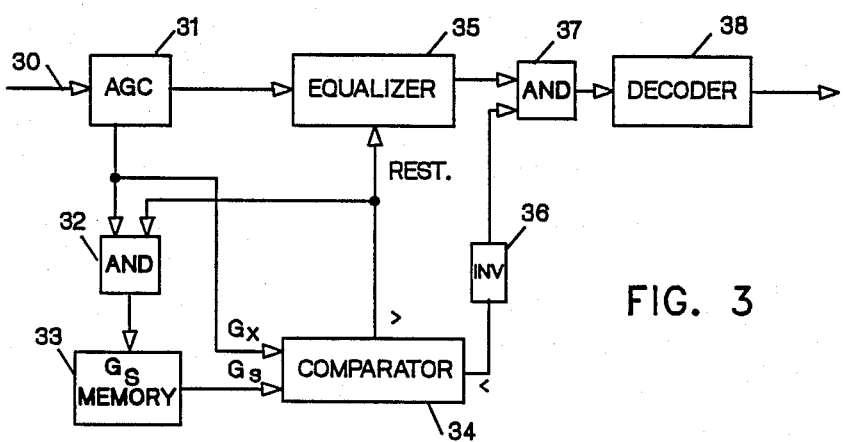
FIG. 3 is a block diagram illustrating an embodiment of the invention.

However, the method of the invention can also be implemented by means of logic circuits, that is, using hardware rather than software. FIG. 3 illustrates by way of example such an implementation.

As has been seen, the digital signals supplied over line 30 are processed by AGC device 31 before they are applied to equalizer 35. However, AGC device 31 first applies the level Gx to one of the inputs of a comparator 34, the other input of which receives the value Gs stored in a level memory 33. If Gx exceeds Gs by at least ΔGs, then the comparator applies a high resetting signal to the equalizer so that the coefficients thereof are reset to zero and computed by using the digital signals of the training sequence. At the same time, this signal is applied as one input to AND circuit 32, thereby allowing the value of Gx to be stored as a new threshold value Gs in memory 33 where it will replace the previously stored value.

If the level Gx computed by AGC device 31 falls short of the stored value Gs by at least ΔGs, then comparator 34 supplies a high signal to inverter 36, which provides a low output signal disabling AND circuit 37. Thus, the received message, which is in fact an echo, is not applied to decoder 38.

If the level Gx is equal, to within ΔGs, to the value Gs stored in memory 33, then comparator 34 supplies no output signal. Thus, the equalizer is not reset; the data signals are processed by the equalizer, the coefficients of which have already been adjusted, before they are applied to decoder 38 through AND circuit 37, which is enabled by the high output from inverter 36. Note that AND circuit 37 is also enabled whenever Gx exceeds Gs by at least ΔGs. In that case, however, the data signals have been processed by equalizer 35, the coefficients of which were adjusted by taking into account the training sequence that precedes the data since a resetting signal was applied by comparator 34 to equalizer 35.

The flow chart of FIG. 2 and the functional diagram of the invention that has just been described with reference to FIG. 3 can be implemented in various ways well within the ability of one skilled in the art and detailed examples thereof need not be given in this description.

We claim:

1. A method for protecting a first modem against echoes during a long-distance communication, particularly via satellite, with a second modem, said first modem including an automatic gain control (AGC) device (31) for adapting the elements of the modem to the energy level of the received signals, an equalizer (35) for equalizing said signals and a decoder for decoding signals provided by the equalizer, said method being characterized in that it comprises the steps of:
   comparing (25, 26) the level Gx provided by said AGC device for a message received from said second modem with a previously saved value Gs,
   supplying a resetting signal (24) to said equalizer to permit adjusting the coefficients thereof and saving (23) the level Gx as a new value Gs, in the event of said level Gx for the received message exceeding said value Gs by a predetermined amount, and
   decoding (27) the received message as well as all subsequent messages for which the level provided by said AGC is higher than or equal to said saved value Gs minus said predetermined amount, and inhibiting transfer of, all received messages for which the level Gx is less than said value Gs minus said predetermined amount to said decoder and will be considered to be echoes.

2. A method according to claim 1, characterized in that it includes the further step of saving as value Gs the level Gx for the first message received by said first modem without further processing.

3. A device for providing protection against echoes in a modem comprising an AGC device (31) for adapting the elements of the modem to the energy level Gx of the received signals, an equalizer (35) for equalizing said signals and a decoder for decoding signals provided by said equalizer said device being characterized in that it includes:
   a level memory means (33) for storing a value Gs, which value is zero before a first message has been received,
   comparator means (34) for comparing the level Gx provided by said AGC device upon receipt of a message with said value Gs stored in said level memory means, and for supplying a resetting signal to the equalizer to reset the coefficients thereof to zero and, simultaneously, a signal for storing level Gx as a new value Gs in said level memory means when said level Gx exceeds said value Gs by a predetermined amount, and for supplying a signal for inhibiting the decoding of the data signals provided by said equalizer to said decoder when said value Gx exceeds the level of Gx by a predetermined amount, thereby indicating that the received message is an echo.

* * * * *